July 24, 1928.
J. P. SHANNON
FISHING LURE
Filed March 25, 1927
1,678,448
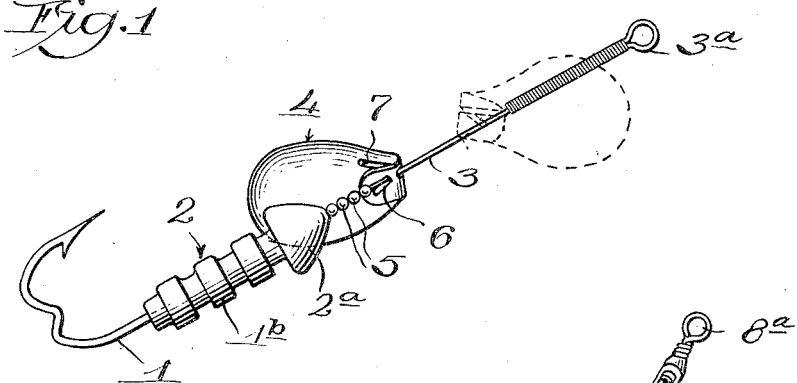
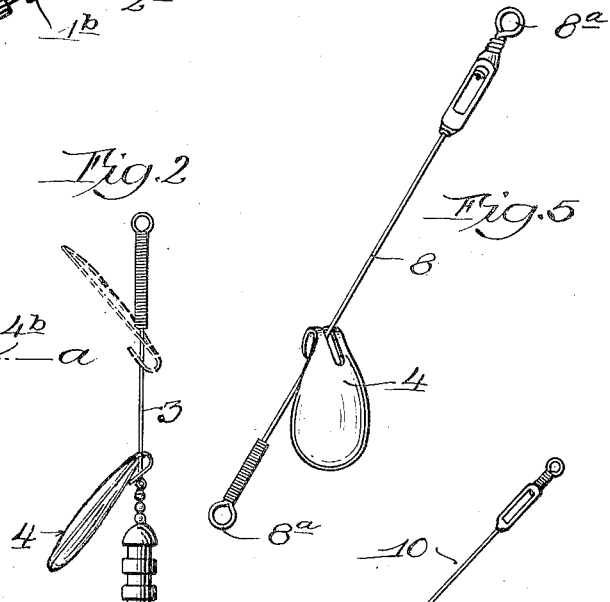
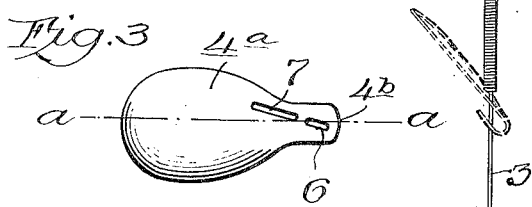
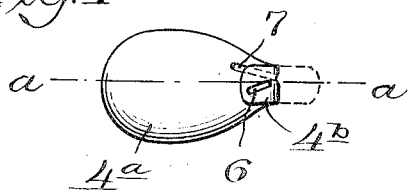
Witness:
Chas. R. Koursh
Inventor,
Jesse P. Shannon, Patented July 24, 1928.

1,678,448

UNITED STATES PATENT OFFICE.

JESSE P. SHANNON, OF LAKE GENEVA, WISCONSIN.

FISHING LURE.

Application filed March 25, 1927. Serial No. 178,185.

This invention relates to improvements in fishing lure and more particularly to an improved spoon lure including a novel mounting for the same, on the shank of a hook or upon a separate wire attached directly behind the hook.

The lure embodying the present invention is particularly adapted for that style of fishing known as bait casting, whereby the bait or lure is alternately cast out and reeled in with the use of relatively light tackle. The bait used may be either live or artificial, or a combination of the two. Bait casting as distinguished from other modes of fishing requires the use of a lure having sufficient weight to obtain distance and accuracy of cast, as well as one which will travel through the air without fouling the line or retarding the flight, and upon striking the water will function as intended.

Experience has shown that perhaps the most dependable lure for bait casting is the spoon used with a baited or concealed hook. In most instances the hook is weighted along the shank and the spoon swiveled on the shank behind the weight, or upon a stiff wire leader inserted between the hook and the end of the line.

While the spoon has long been used in combination with the feathered-gang hooks and as "spinners" in various kinds of lures, they have been largely used with unweighted hooks which require the addition of weight for casting, with the result that on the cast the weight usually travels through the air ahead of the hook with the possibility of same becoming fouled or entangled in the line.

It follows therefore, that a proper lure for bait casting is one that not only travels properly through the water, but also through the air during the cast. Wind or resistance of the air acting on the ordinary spoon lure will influence the distance and direction of the cast, since the spoon has a tendency to "catch the wind" and retard and deflect the lure from its course before it strikes the water.

The object of the present invention is therefore to combine features of construction in a spoon lure which takes into account its travel through the air as well as the water and thus obviate the difficulties in casting, which skill alone cannot overcome.

A preferred embodiment of the invention is disclosed in the accompanying drawings in which:

Figure 1 is a perspective view of one style of lure, in which the spoon is mounted on an extended shank portion of a weighted hook.

Figure 2 is a view of the spoon shown in Figure 1, held in vertical position, showing the extreme angular positions of the spoon.

Figures 3 and 4 are views of the spoon before and after bending the attaching end.

Figure 5 is a view of a spoon mounted on a stiff wire leader, and

Figure 6 is a modified mounting for a spoon.

A spoon as known in the fishing art, is a thin oval nickel plate disc dished slightly so that it is concave on one side and convex on the other, and usually attached to a particular lure by a suitable swivel mounting which allows the spoon to spin as it travels through the water, and thus attract the fish.

The spoon used in the present lure is of the same general style and shape as heretofore used, and its purpose is the same. Its novelty, however, resides in its mounting, which defines and limits its action when travelling through the water as well as through the air, the latter aspect being entirely overlooked in the usual spoon mounting.

Figure 1 discloses a very satisfactory arrangement for a lure, consisting of a hook 1 of the standard design, except that it has a relatively short shank which is entirely concealed by a lead weight 2 having a cylindric portion 2ª extending along the shank and terminating in a conical shaped head 2ᵇ directed toward its free end. Extending beyond the weight 2 is a stiff wire 3 terminating in a loop 3ª at its free end. Mounted on the wire 3 is a spoon 4 free to rotate and to slide thereon. Several steel beads 5 are preferably strung on the wire between the spoon and the weight to act as bearings for the spoon to turn upon. In the form shown, the end of the shank of the hook 1 and the wire 3 are joined by connected eyes, but these are surrounded by and embedded in the weight 2 so that said extension is in reality an integral portion of the hook shank although of a reduced size and of a more resilient character. The shape of the weight is not of vital consideration, although shown as having a series of annular spaced depressions throughout the reduced cylindric portion 2ª.

Referring now to the spoon 4, the same has the usual oval or pear-shaped body portion 4ª of thin gauge metal, preferably dished, and nickel plated in the usual manner. At its upper or smaller end is formed a narrow extension or neck portion 4ᵇ, which in the blank (Figure 3) projects a distance about ¼ of an inch beyond the body or main portion of the spoon, and symmetrical with respect to the major axis $a$—$a$ thereof. Near the end of the neck portion 4ᵇ is a short slot 6, extending generally in a longitudinal direction, but at a distinct angle of inclination to the major axis $a$—$a$, as clearly shown in Figure 3. This slot 6 terminates short of the base of the neck portion and beyond the same is a somewhat longer slot 7 beginning approximately at the base of said neck portion and extending well into the body portion 4ª. This longer slot 7 is in line with the shorter slot 6, but separated by a short space and is also inclined to the major axis and well toward one edge of the body portion. The inclination of these slots to the major axis $a$—$a$ is approximately 30° although this angle may be greater or less as desired.

As shown in Figures 2 and 4, the neck portion 4ᵇ is bent back and over the body portion into substantially U-shape, the bend occurring at the junction of the body with the neck portion, thus forming a tongue spaced from said body portion and including the shorter slot 6. By preference the neck is bent toward the concave side of the body portion and is spaced therefrom by a distance of about ⅛ of an inch (considering the disclosure as full size). The U-shaped bend at the base of the neck portion also includes the extreme end of the longer slot 7. Moreover, after the neck portion is bent the two slots 6 and 7 no longer lie in the same straight line but at an angle to each other as shown in Figure 4, inasmuch as the line of bend is oblique to the line of the slots.

Thus when the spoon is threaded onto the wire 3, as in Figure 1, it passes through both slots 6 and 7 with the following results: First, assuming that the hook is held upright with the wire 3 vertical as in Figure 2, the spoon will hang down but at the same time will stand out from the wire at an angle of about 30° and clear of the weight, due to the fact that the wire engages the outer end of the shorter or under slot 6, and likewise the outer end of the longer or upper slot 7, the points of contact being spaced apart so that the spoon cannot approach the wire closer than the slots permit. Furthermore, since these two ends of the slots are offset from each other the spoon stands off center with respect to the wire (its axis of rotation), that is, the line representing the major axis of the spoon is oblique to the wire, both vertically and laterally. Again, the spoon stands with one edge further removed from its axis of rotation than at the other edge, this being due also to the inclination of the slots. In short, the spoon assumes a position with respect to the wire similar to that of a propeller blade to its shaft.

By reason of this mounting the spoon maintains the same relative position to the shank or wire as it spins when the lure is being drawn through the water, although as a practical matter the spoon would tend to swing away from its normal axis of rotation due to its propeller action as it encounters the resistance of the water. However, the spoon cannot approach the shank or the weight closer than 30° or such other desired angle and, therefore, it is impossible for the same to cling to the weight or foul the bait carried on the hook.

On the other hand, when the lure is cast through the air the weight carries the hook foremost through the air with the spoon trailing the momentum of the weight and the resistance of the air against the lighter spoon, causing it to slide to the opposite end of the wire and at the same time to swing bodily in the same direction, namely, to the same relative position on the wire, but with its free end pointing rearwardly as shown in dotted lines in Figures 1 and 2. In reversing its position, the spoon is guided by the slots 6 and 7 through which the wire slides to the opposite ends thereof when the two bearing contact is again established, thus holding the spoon in the same relative position as before, and free to spin. But due to the fixed angular position of the spoon and the obliquity of its plane to the direction of forward movement, it rotates as the lure travels through the air, and this rotative motion tends to hold the lure in a straight line without materially retarding its travel. In other words, the spoon has somewhat the same directive influence on the travel of the lure as have the feathered ribs at the tail end of the arrow or the vanes of an aerial projectile.

As already explained the spoon may have a mounting separately from the hook as shown in Figure 5, namely, a stiff wire leader 8 with eyes 8ª (plain or swiveled) at each end, inserted between the hook and the end of the line.

So also, the same results may be obtained with a slightly different mounting of the spoon, as shown in Figure 6. Here the spoon 9 is of the standard form, and is swiveled on the wire leader 10 by means of a U-shaped clevis 11, consisting of a short strip of metal bent to shape and passed through a slot 9ª extending obliquely near one edge thereof, the ends of the clevis have holes through which the wire passes. To limit the swinging movement of the spoon relative to the clevis, the latter is provided with a shoulder 11ª near one of its ends, which acts to hold the spoon away from the wire and at the desired angle.

A spoon constructed and mounted in the manner herein described has several distinct advantages. As preferably constructed the spoon is made in one piece and is directly mounted on its leader without intermediate connections, and by reason of its two point bearing it has ample freedom of action to function properly with all types of lure, yet restricted against free movement into positions which hamper the movement of the lure through the water and air, as for instance, the catching of wind, fouling of line or net and catching of weeds.

Having set forth the features embodying the invention and advantages thereof,

I claim:

1. A fishing lure comprising a shank, a spoon having an attaching portion at one end engaging said shank at points spaced apart longitudinally thereof, said spoon and attaching portion having a predetermined arrangement of slots embracing said shank to permit said spoon to swing bodily toward and from the ends thereof in an arc of definite direction and magnitude.

2. A fishing lure comprising a shank, a spoon having a body portion and an extended end portion, said portions having slots therein through which said shank passes, one of said slots being extended into said body portion to permit said spoon to swing bodily toward and from opposite ends of said shank and in an arc of predetermined direction and magnitude.

3. A fishing lure comprising a wire, a spoon rotatively and slidably mounted on said wire and consisting of a body portion having an extended end portion bent in U-shape and slots formed in the end and body portions through which said wire passes to permit said spoon to swing bodily toward and from opposite ends of said wire in an arc of predetermined direction and magnitude.

4. A fishing lure comprising a wire, a spoon rotatively and slidably mounted on said wire and consisting of a body portion having an extended end portion bent in U-shape, and slots formed in said end and body portions through which said wire passes, said slots being arranged at predetermined angles to each other and of a length to permit said spoon to swing bodily toward and from opposite ends of said wire within a predetermined arc.

5. A fishing lure comprising a wire, a spoon mounted for rotative and endwise sliding movement on said wire and consisting of a body portion and an extended end portion bent in substantially U-shape and having longitudinal slots formed on opposite sides and engaging said wire, said slots being oblique to each other and to the major axis of said spoon whereby the same is free to swing bodily toward and from opposite ends of said wire in a definite arc and at a predetermined angle of obliquity to said wire.

6. A fishing lure comprising a wire leader, a spoon mounted for rotative and endwise sliding movement on said wire and consisting of a body portion and an extended end portion bent over and toward said body portion in substantially U-shape, said end and body portions having longitudinal slots through which said wire passes, the slots in said body portion extending from the base of said end portion toward the free end thereof and oblique to the other slot, whereby said spoon is free to swing bodily toward and from opposite ends of said wire in a definite arc and to be held at a predetermined angle of obliquity to said wire at the ends of its arc of bodily swinging movement.

Signed at Lake Geneva, Wis., this 17th day of March, 1927.

JESSE P. SHANNON.